United States Patent [19]

Turner

[11] Patent Number: 4,631,087
[45] Date of Patent: Dec. 23, 1986

[54] SURFACE COATING COMPOSITIONS

[75] Inventor: John H. W. Turner, Stockport, England

[73] Assignee: Alcan International Limited, Canada

[21] Appl. No.: 683,312

[22] Filed: Dec. 18, 1984

[30] Foreign Application Priority Data

Dec. 22, 1983 [GB] United Kingdom ............... 8334268

[51] Int. Cl.$^4$ ..................... C08L 91/00; C08K 5/04
[52] U.S. Cl. ................... 106/252; 106/264; 106/310; 524/399
[58] Field of Search ............ 106/252, 264, 310; 524/399

[56] References Cited

U.S. PATENT DOCUMENTS

| | | | |
|---|---|---|---|
| 2,308,988 | 1/1943 | Mathes | 106/267 |
| 2,414,427 | 1/1947 | Zurcher | 106/287.18 |
| 2,613,162 | 10/1952 | Chatfield | 106/310 |
| 3,046,153 | 7/1962 | Unkefer | 106/310 |
| 3,298,848 | 1/1967 | Wachholtz | 106/310 |
| 4,221,685 | 9/1980 | Eschwey et al. | 428/430 |
| 4,264,370 | 4/1981 | Turner | 106/264 |

FOREIGN PATENT DOCUMENTS

| | | |
|---|---|---|
| 931188 | 7/1955 | Fed. Rep. of Germany . |
| 2302988 | 10/1976 | France . |
| 907558 | 10/1962 | United Kingdom . |
| 972804 | 10/1964 | United Kingdom . |
| 1434191 | 5/1976 | United Kingdom . |
| 1462610 | 1/1977 | United Kingdom . |
| 1544405 | 4/1979 | United Kingdom . |

Primary Examiner—Theodore Morris
Attorney, Agent, or Firm—Lowe, Price, LeBlanc, Becker & Shur

[57] ABSTRACT

The invention provides metal-containing organic compositions for use as additives to surface coating compositions comprising:

(i) at least one aluminium compound which is an aluminium alkoxide, or a compound derived from an aluminium alkoxide by an addition, substitution or condensation reaction;
(ii) a stabiliser comprising at least one organic base or a mixture of an organic base with ammonia;
(iii) a metal-containing organic compound wherein the metal is selected from Cu, Mn, Fe, Co, Zn and the rare earth metals; and optionally
(iv) added water.

The invention also provides surface coating compositions comprising an additive as just defined in a polymerized drying or semi-drying oil, an alkyd resin or an oleo-resinous medium.

The compositions have suitable solubility, stability and compatability when added to surface coating compositions such as paints, and confer on the paints such improved properties as better drying performance, enhanced water resistance, reduced discoloration on aging the applied film, and reduced sensitivity to oxidative degradation and bio-degradation.

15 Claims, No Drawings

SURFACE COATING COMPOSITIONS

This invention relates to metal-containing organic compositions and to surface coating compositions containing them.

It is known that when a paint including drying oils or oleo-resinous media is applied as a film and then exposed to the atmosphere, it is converted, by a process of oxidative polymerisation, from the liquid to the gel state. This conversion is usually expedited by the incorporation in the paint of paint driers. Generally these are oil-soluble, metal-containing organic compounds or compositions, usually of cobalt, manganese or lead, all in the divalent state, combined with naphthenic acid or other suitable carboxylic acids to ensure their compatibility with the paint medium to which they are added. Rare earth metals such as cerium are also known to function as paint driers. The driers may be used individually but are more often used, for example, in the form of a mixture of the cobalt or manganese drier with the lead drier. Cobalt driers are uniquely effective in expediting the surface drying of the applied film but are less effective in causing uniform gelation throughout the thickness of the film. Because of this, the use of cobalt driers alone can result in "surface skinning" which may give rise to other defects such as "wrinkling". On the other hand, lead driers are most effective as "through driers" but relatively ineffective as "surface driers". By using the cobalt and lead driers in suitable proportions, the paintmaker has usually been able to achieve the required balance of surface and through drying properties appropriate to the application. At atmospheric temperature manganese driers are generally inferior to cobalt driers but they can be used as an alternative to cobalt in industrial paints formulated for stoving applications. Rare earth metals particularly cerium may also be used optionally in conjunction with cobalt driers to contribute specific drying properties but they have the disadvantage of causing discoloration and have not been extensively used.

The role of paint driers is catalytic and is more fully described and explained by C. E. H. Bawn Ph. D., F.R.S., in Journal of the Oil and Colour Chemists' Association, August 1953, No. 398 Vol. XXXVI, "Autoxidative Reactions: their Chemistry, Mechanism and Catalysis by Metal Salts". The catalytic effect of the driers may persist after the paint has dried and accelerate the processes of paint film oxidative degradation. This results, initially, in progressive hardening and embrittlement of the applied film, and is followed by loss in film weight due to the formation and escape of volatile oxidation products, and diminishing effectiveness of the paint film as a decorative and protective coating. Associated with these changes, there is a variable tendency for the paint film to discolour, and for the detachment, as a powder, of certain pigments, notably titanium dioxide, by the process of "chalking".

Some non-catalytic metal-containing organic compounds, notably basic calcium soaps with an acid accepting potential, which are classified as secondary or auxiliary driers, may also be used to enhance the effectiveness of the primary, catalytic driers, particularly under adverse drying conditions. These calcium driers are known to be effective in improving the drying rate of paints at low temperatures. They also improve the stability and effectiveness of lead driers in media of high acidity which may cause losses of lead by precipitation of insoluble lead compounds. For these and other reasons calcium driers are widely used in paints. But there is evidence that the presence of calcium driers in the paint film contributes adversely to its water-resistance and durability, and may be a potent factor in accelerating its failure as a decorative and protective coating.

Oil-soluble barium soaps and zinc and copper compounds are examples of other divalent metal-containing organic compounds which make a less significant contribution to the paint-drying process but may be added to paints to contribute other useful properties, such as biocidal activity.

However, the highly toxic nature of the lead driers is restricting their continuing use as the major "through drier" available to the paintmaker. For this reason there is a need to find a suitable alternative.

Likewise, the continuing availability of cobalt driers has been threatened by shortages in supply attributable to political factors and the limited known distribution of cobaltic minerals of economically recoverable cobalt content. The use of cobalt for paint driers is also thought to rank lower in strategic and industrial importance than its use in high technology metallurgy. For these reasons it is considered important to find effective replacements for both cobalt and lead driers.

It is known that some aluminum compounds used to impart a plastic or thixotropic structure to paints and printing inks also contribute "through drying" properties to the paints and inks in which they are incorporated. However, the increase in consistency resulting from their use necessitates an increase in the dilution of the paint or ink with a volatile solvent. This, in turn, results in the application of a lower residual weight of paint and therefore a diminution of both protective and decorative value.

British Pat. No. 972,804 describes compositions of metal organic compounds containing aluminium or boron and at least one divalent element or metal radical, the aluminium or boron being linked through oxygen atoms and the product containing at least one carboxylic acid radical. Such products in which the divalent metal is cobalt or manganese and the trivalent element is aluminium when mixed with oleo-resinous paints and applied as a film, were capable of providing a satisfactory combination of "surface" and "through" drying properties and of film thickness, but proved unsatisfactory in storage stability when used with many media based on proprietary alkyd resins.

More satisfactory drier combinations were obtained by mixing conventional cobalt or manganese driers with the aluminium compounds of British Pat. No. 1,462,610 or, more preferably, with compounds of British Pat. No. 1,544,405, or with oxo aluminium compounds prepared according to the teachings of British Pat. No. 907,558. When these compositions of cobalt or manganese driers with the aluminium alkoxoacids, or substituted aluminium alkoxides, or oxo aluminium compounds, were added to paints using alkyd media of suitably low viscosity and reactivity, the paint showed a much reduced tendency to thicken on storage. They also proved to be superior in surface- and through-drying properties to similar paints using conventional cobalt, lead and calcium driers. However, when the same combinations of cobalt or manganese driers with these aluminium compounds were added to paints employing more reactive alkyd media of higher viscosity and acidity, the resulting paints thickened and were deemed to be unacceptable in storage-stability, though again, quite satisfactory in drying properties. This sensitivity to variations in medium reactivity shown by these combinations of conventional cobalt and manganese driers with these aluminium compounds of improved stability, though reduced, was considered to limit, too seriously for commercial development, their usefulness as practical alternatives for the conventional cobalt, manganese and lead drier mixtures.

We have now found how to provide mixtures or combinations with aluminium compounds, of metal-containing, organic paint driers which can be added to oil, oleo-resinous and alkyd paint media of widely ranging composition and reactivity, to confer drying performance equal to or better than that provided by the use of conventional driers, without the undesirable thickening which has characterised the prior use of aluminium compounds, to provide the "through-drying" and other desirable properties in the applied paint film.

This objective is achieved by incorporating, in the mixture or combination of the catalytic paint driers and the aluminium compound, an organic base or a mixture of an organic base with ammonia, either or both of which may optionally be partially hydrated by the pre-addition of water together with a metal-containing organic compound.

Thus, the present invention provides metal-containing organic compositions for use as additives to surface coating compositions comprising:

(i) at least one aluminium compound which is an aluminiumal-koxide or a compound derived from an aluminium alkoxide by an addition, substitution or condensation reaction;

(ii) a stabiliser comprising at least one organic base or a mixture of an organic base with ammonia;

(iii) a metal-containing organic compound wherein the metal is selected from Cu, Mn, Fe, Co, Zn and the rare earth metals; and optionally (iv) added water.

The invention also provides surface coating compositions comprising an additive as just defined in a polymerised drying or semi-drying oil, an alkyd resin or an oleo-resinous medium.

The present invention provides additive compositions of suitable solubility, stability and compatibility when added to surface coating compositions such as paints, and which confer on the paints such improved properties as better drying performance, enhanced water resistance, reduced discolortion on aging the applied film, and reduced sensitivity to oxidative degradation and bio-degradation.

The preferred bases are compatible before and after reaction, with the composition comprising the drier and aluminium compound, and with the paint medium to which it is added. For this reason, the selection of the base is determined, inter alia, upon the choice of other compounds of the additive composition and on the type of medium with which it is used.

The preferred organic bases are amines and may be aliphatic, cycloaliphatic or aromatic, primary, secondary or tertiary amines. The amines may have, for example, boiling points within the range of 40° C. to 240° C. but amines with higher boiling points can also be employed. The hydrocarbon moiety to which the amino group is attached may contain one or more substituents selected from halogen, hydroxyl, carbonyl, ester, amide, ether and amine substituents. Anhydrous ammonia is too volatile to use on its own but, in the form of ammonium hydroxide having a specific gravity of about 0.880, it can be used in some compositions as the sole stabiliser but, more preferably, as a partial replacement for some more compatible organic base, as a solution in the suitable organic base and or suitable volatile organic solvent.

The organic bases used according to the present invention must have not only a suitable stabilising ability but also preferably an acceptable smell, toxicity or antioxidant effect for use in paints. Thus, for example, diethylamine, n-butylamine and piperidine all smell strongly and, hence, although their contibution to stability is good their use in paint is less preferred. Others, like dimethylaminoethanol, exhibit a desirable combination of stabilising efficiency with an acceptable odour which make them particularly useful as stabilising additives.

Suitable bases having the desired stabilising capability include:

Ammonium hydroxide;
Diethylamine, n-butylamine, piperidine;
Dimethylaminoethanol, diethylaminoethanol, dimethylamino isopropanol;
Morpholine, monoethanolamine;
Ethylene diamine, propylene diamine, hexamethylene diamine, dipyridyl, phenanthrolines;
Amine-terminated polyamide;
Tri(dimethylaminoethyl)borate; and
monohydroxyethyldimethyl ammonium linoleate.

The amount of base in the additive composition required to stabilise a paint against thickening with aluminium compounds will depend upon the equivalent weight of the base, the reactivity of the paint medium, the composition of the aluminium compound and the amount of water optionally used to moderate the reactivity of the aluminium compound. A typical base content of the additive composition is, for example, sufficient to provide an amount between 0.2% and 10%, more preferably between 1% and 10%, of the non-volatile medium to which the stabilised additive composition is added.

Particularly preferred bases according to the invention include ethylene diamine with a molecular weight of 60 and an equivalent weight of 30, dimethylaminoethanol with a molecular weight and equivalent weight of 89 and tri(dimethylaminoethyl)borate with a molecular weight of 323 and an equivalent weight of about 108. The minimum percentage of each of these bases required to stabilise a medium of which the non-volatile content has an acid value of 5 mgm.KOH per gram, will be, respectively, 0.27%, 0.79% and 0.96% on the non-volatile content of the medium. Corresponding additions needed to neutralise the acidity of a medium of which the acid value of the non-volatile content is 20 would be, respectively, 1.07%, 3.18% and 3.85% on the non-volatile content of the medium. Of these three bases, the most preferred is dimethylamino ethanol. IN practice, an addition of 0.8% of dimethylamino ethanol on the non-volatile content of the medium is found to be adequate for acceptable stability when the medium is an alkyd resin of low viscosity and low acid value such as might be preferred for use in the formulation of air-drying media for decorative gloss paint applications. The stabilisation of media of higher viscosity and higher acid value may require an addition of base greater than the theroretical minimum to ensure the desired stability. It is postulated that one reason for this may be competing action for the base by other substituent groups in the medium such as active methylene groups and especially hydroperoxidised methylenes, and by aluminium compounds, especially the alkoxides and alkoxo acids added to the media.

Therefore, about 5% of dimethylamino ethanol is required to ensure the stability of such potentially reactive media as high viscosity alkyd resins having an acid value of about 20, when employing additions of driers incorporating aluminium compounds at 0.5% by weight based on the non-volatile content of the medium. Media employing alkyd resins of higher acid value require further additions of dimethylamino ethanol to ensure their complete neutralisation. This would amount to a 1.6% increase for each increase in acid value of 10 mgm.KOH/gm.

The optimum water content may also vary with the particular base used and the reactivity of the medium to which the drier composition is to be added. Thus, for example, the preferred water content of the stabilised drier composition may range from one half to three mols of water per mol of base, but in some circumstances, notably when the molar proportion of aluminium compound to divalent metal compound is high and the aluminium compound used is an alkoxide or substituted alkoxide, the ratio of water to base may extend beyond these limits.

The role of water as an optional additive is important, in two respects, in the contribution it makes to the stability of media incorporating the driers of the invention. Firstly, water reduces substitution reactions between the alkoxide content of aluminium components of the drier and alcoholic hydroxyl components of the medium which cause instability on storage. The stabilising base minimises the risk of storage instability resulting from the content of carboxylic acid component; and the water addition is made to eliminate the possibility of a relatively high concentration of hydroxyl groups being a similar cause of reaction and instability on storage. Preferably water is added in an amount of one half to one mol of water for each alkoxide group present in the aluminium compound used and may range from a maximum of 2 mols of water per Al atom to the absolute minimum of no water addition in the total absence of alkoxide substituents. When the aluminium content is 0.5% based on the non-volatile components of the medium, the preferred water content is between 0 and 0.67% based on the weight of non-volatile medium, and the most preferred water content in a medium using an alkyd resin of moderate viscosity and having an acid value <12 is generally between 0.07% and 0.4% and, most preferably, between 0.2% and 0.4% based on the weight of non-volatile medium. For example, a paint employing as medium an alkyd resin having an acid value of 10 and a viscosity of 2 poises when diluted with white spirit to a non-volatile content of 55%, and containing as drier a combination or mixture of cobalt Co/-non-volatile and aluminium compounds to provide a Co/non-volatile medium content of 0.06% and an Al/-non-volatile medium content of 0.5% can be expected to be stabilised satisfactorily against thickening on storage by the incorporation of 0.3% water and 1.5% dimethylamino ethanol on its content of non-volatile medium.

Secondly, water makes a contribution to the stability of paints according to the invention by acting as a peptising agent for the macromolecular structure of the medium directly, or, indirectly, by the partial hydrolysis of alkoxide substituents of the aluminium compound used in the paint and the release of by-product alcohol. The joint use of water and amine bases is particularly effective in the stabilisation of highly associated alkyd resin solutions and results in a reduced need for excess of amine over the theoretical neutralising requirement.

Examples of suitable metal-containing organic compounds include acyloxides, in particular the acyloxides of cobalt, manganese and iron. Suitable acyloxides include naphthenate, 2-ethyl hexoate and isononoate, Versatate or fatty acylates such as oleate or linoleate. Stearate substituents are appropriate for some applications requiring high water repellency. Some oil-soluble compounds of tri-valent metals of Group IIIa, particularly Ce may also be used in the form of their tri-acylates or derivatives thereof.

Proprietary compositions such as cobalt boro-Versatate have also proved suitable. These compounds may be used in the form of their solutions in a suitable solvent such as white spirit or xylene.

These divalent metal-containing organic compounds, as their solutions in a suitable diluent such as white spirit, may be added direct to the paint medium, before or after pigmentation, or they may be pre-mixed with the aluminium compound. If the metal-containing organic compound is added directly to the paint medium or the paint, the amount will be such as to provide the required concentration of the metal ion relative to the non-volatile paint medium. This may vary with the particular metal, the medium and the application for which the paint is intended. In relation to the non-volatile medium the preferred concentrations of metal ion are, for cobalt 0.03% to 0.06%, for manganese 0.02% to 0.06% and for cerium-rich rare earth metal compounds, 0.02 to 0.08% of cerium and/or other rare earth metal ions. Used with the aluminium compounds of the invention, cobalt, manganese and cerium-rich rare earth metal compounds are particularly effective paint driers for use at atmopsheric temperature. The iron compounds have a more limited application as paint driers but, particularly at a concentration of 0.03% to 0.06% may be required for use in certain paints formulated for stoving applications at elevated temperatures.

An alternative is to mix the metal-containing organic compounds with one or more of the aluminium compounds.

The required amount of base and water stabiliser may be added to the paint medium before or after pigmentation. The addition before pigmentation has the advantage of expediting the neutralisation of the carboxylic acid component of the paint medium and of facilitating the processes of pigment wetting and dispersion. Alternatively, the premix of stabilising base and water may be added direct to the aluminium compound and preferably before the addition of one or more of the metal-containing organic compounds.

Water- and alcohol-soluble metal salts of carboxylic acids such as acetic, propionic and methacrylic acids have also been found satisfactory. Although these salts and their hydrates are insoluble in hydrocarbons and are incompatible with most oleo-resinous media, wh have found that they can be complexed with amines and condensed with aluminium compounds to provide products which are tolerant to hydrocarbons, are compatible with oleo-resinous media, and function efficiently as paint driers. After the applied film in which such compounds are used has dried, there is evidence that the compatibility of the complex is diminished by the progressive loss, from the film, of volatile amine. This appears to reduce the catalytic potential of the drier in the subsequent progressive process of oxidative degradation.

The preferred complexes of metal-containing organic compounds with amines for use in the compositions and processes of the invention are the carboxylic acid salts of divalent cobalt, magnanese and iron, complexed with dimethylamino ethanol or with diethylamino ethanol which may be substituted, preferably partially, by equivalent amounts of other amines and/or diamines such as ethylene diamine, bipyridyl, hexamethylene diamine of phenanthroline, to modify the properties of the complex. The most preferred are cobalt and manganese acetate complexes with dimethylamino ethanol employing between 2 and 4 molecules of the dimethylamino ethanol to complex with one molecule of the metal acetate. The complexes may be derived by reaction between the metal acetate and the amine which involves heating to about 60° C. the metal acetate in the form of its tetrahydrate with a 2 to 4 molar equivalent of dimethylamino ethanol in the presence of a compatible mutual solvent, such as methoxypropanol. The resulting solution containing the water of crystallisation remains stable on prolonged storage but its water content may be precipitated as a hazy suspension when the solution is added to a hydrocarbon solution of an alkyd resin. If instead of being added direct to the paint medium, the solution is first added to an aluminium compound containing sufficient alkoxide component, it is dehydrated by reaction of the alkoxide with its water content and the combined product of metal acetate complex with aluminium compound provides an efficient drier compatible with polymerised oils, oleo-resinous and alkyd media.

Alternatively, the complexes may be obtained, indirectly, by dehydrating and condensing a solution of the metal acetate with a suitable aluminium compound having an alkoxide component, and subsequently introducing the amine to the metal acetate/aluminium composition in the anhydrous state. If desired, the metal acetate may be made as a solution by direct reaction between the metal and an aqueous acetic acid solution. For example, manganese metal reacts readily with an equivalent weight of acetic acid as a 40% solution in water and further diluted, to about 19% concentration, by the addition of ethoxyethanol or methoxypropanol. Under reflux conditions the reaction is complete in about 30 minutes and provides a clear pink solution of manganous acetate in aqueous alcoholic solution. On cooling the solution has a marked tendency to supercool and may remain supersaturated for a day or more if left undisturbed. The addition of a 2 to 4 molar equivalent of dimethylamino ethanol to this supersaturated solution stabilises it and prevents crystallisation even at sub-zero temperatures. If, however, the same amount of amine is added to the hot solution of manganous acetate, it darkens rapidly and, in a short time, a sediment, apparently of oxidised manganese hydroxides, is deposited.

Alternatively, the hot solution of manganous acetate may be added directly to an aluminium compound containing sufficient alkoxide to react fully with the water content of the solution and provide a clear reaction product incorporating the manganous acetate. The by-product alcohol of this reaction may be removed, if desired, by heating and distillation, to form a hydrocarbon soluble complex of manganous acetate and oxo aluminium compound which can be further stabilised by the addition of the required amount of amine. The product, diluted with hydrocarbons such as white spirit is stable on prolonged storage and compatible with oleo-resinous paint media to provide a medium of satisfactory drying performance. Likewise, aqueous solutions and/or solid tri-acetates of tri-valent cerium or other rare earth metals, may be incorporated homogeneously in aluminium compounds having a sufficient alkoxide content to react fully with the water introduced to form the oxo compound. The reacted cerium/aluminium product may then be stabilised against premature reaction with reactive paint media by the appropriate addition of amine and water stabilisers.

The direct preparation from cobalt metal of cobalt salts of carboxylic acids is more difficult because of the resistance of cobalt metal to attack by carboxylic acids with or without water dilution. However, the reaction can be initiated and sustained by replacing acetic by peracetic acid or by replacing the water diluent by an aqueous hydrogen peroxide solution to form the peracetic acid "in situ". Alternatively, cobalt acetate solution and solutions of other cobalt salts, such as the methacrylate, can be obtained by direct reaction between the appropriate acid and cobalt hydrate.

A surprising and valuable aspect of this invention is the contribution to drying performance shown by the manganese compared with the cobalt driers when both are used with the stabilised aluminium compounds in accordance with the invention. This appears to be the case both when the manganese and cobalt driers are of the conventional compositions well known to the paint maker and when both driers are of the amine complex type according to this invention. We find that the combination of manganese and aluminium to provide metal concentrations on the non-volatile medium content of 0.02 to 0.06% Mn and 0.05% Al contribute drying performance closely comparable and sometimes superior to concentrations of 0.06% Co and 0.5% Al, and that results from both these drier combinations are generally superior and sometimes, considerably superior to results obtained from the conventionally used 0.06% Co and 0.6% Pb, with and without the addition of auxiliary calcium driers at about 0.25% Ca concentration. Furthermore, we find that in other film properties, and, notably in colour and colour retention, initial gloss and gloss retention after exposure to artificial or natural weathering, and in the delay of the onset of chalking of paints pigmented with titanium dioxide, paints incorporating the driers of our invention are generally substantially superior to paints of similar composition incorporating the conventional cobalt, lead and calcium driers.

The reason for the excellent contribution to drying performance of manganese compounds used with aluminium compounds of the invention, is not fully understood but may be related to the efficiency of manganese as a catalyst for oxidation processes and its relative weakness compared with cobalt as a free radical promoter. This may result in manganese catalysis providing more numerous and more stable oxidation products capable of co-ordination and substitution reactions with aluminium compound used with it. This might provide a chemically different but physically similar change in the applied film structure which would account for their comparability in drying performance.

The contribution to improved gloss retention, colour stability and delayed onset of chalking when exposed to natural and accelerated weathering appears to be attributable entirely to the contribution of the stabilised aluminium component, probably in diminishing water absorption by the applied film and, therefore, diminishing oxidative degradation.

The aluminium compounds used in the composition according to the invention for contributing to paint the required "through drying" properties and the additional improvements in water-resistance, gloss-retention and colour-stability, include, for example, aluminium alkoxides and compounds derived from aluminium alkoxides by addition, substitution or condensation reactions. The aluminium compound may therefore be an aluminium alkoxide or a substituted alkoxide, an aluminium alkoxo acid or a substituted alkoxo acid, or an oxo aluminium compound derived from aluminium alkoxides and substituted alkoxides by condensation reactions. The substituents used in these aluminium compounds may be drawn from higher alcohols, phenols, the enolic form of beta-diketones such as acetoacetic esters and acetyl acetone, and carboxylic acids. Of these, the preferred substituent for most applications is an enolate.

Additionally, substituents arising from the condensation of aluminium alkoxides with hydroxyl groups of basic divalent metal salts and, particularly, of monocarboxylates of cobalt, manganese, zinc and copper, may also be included according to the teachings of British Pat. No. 972,804.

The invention further provides a process for the preparation of a surface coating composition as previously defined which comprises (A) adding a part or all of the stabilising base and optionally water to a composite of aluminium compound and divalent-metal-containing organic compound or trivalent rare earth metal organic compound and adding the resulting mixture or complex to the paint medium before or, preferably, after any optional pigmentation; or (B) adding part or all of the stabilising base and optionally water to the paint medium before or after any optional pigmentation, and subsequently, preferably after optional pigmentation, adding the unstabilised or partially stablised composite of aluminium compound with divalent-metal-containing organic compound.

By exercising these options it is possible to ensure that the use is avoided of undesirable excess of the stabilising base and water component in both the stabilised composite of aluminium compound and divalent metal drier.

The invention is further illustrated by the following Examples.

EXAMPLES 1.1. TO 1.8

These Examples and Comparative Examples employed as paint medium a solution of a proprietary oil-modified alkyd resin conforming with the following specification:

| | |
|---|---|
| Maximum acid value | 10 mgms · KOH/gm |
| Solids content when diluted with white spirit to 2 poise viscosity | 62% |
| White spirit tolerance | complete |
| Phthalic anhydride content | 22% |
| Oil content as fatty acid | 70% |
| Oil type | Linoleic |
| Esterifying alcohol | Pentaerithrytol |

The resin was diluted with white spirit to a viscosity of 2 poises (62% non-volatiles) to provide paint medium Preparation 1. To Preparation 1 were added the proprietary cobalt, manganese, lead, cerium and calcium driers at the metal concentrations recommended for alkyd media of this type. In the Example 1.4 and Comparative Examples 1.3 to 1.6, in which the proprietary cobalt and manganese driers were used with the aluminium compound, however, their concentration was reduced from the conventional 0.06% to 0.03% which previous work had shown to be adequate for this metal combination. The aluminium compound used in Example 1.4 and Comparative Examples 1.3 and 1.6 was an oxo aluminium compound diluted with white spirit to an Al content of 10%. It contained, as substituent, the enolate of ethyl acetoacetate. Examples 1.4, according to the invention, was stabilised by the pre-addition to Preparation 1 of 1.5% on alkyd resin solids of dimethylaminoethanol (DMAE) containing water as mono-hydrate.

TABLE 1

| Example | Driers, as metal, and DMAE/Water (%) | | Beck Koller Drying Rate (Hours) | | | | Comments |
|---|---|---|---|---|---|---|---|
| | | | Stage 1 | Stage 2 | Stage 3 | Stage 4 | |
| 1.1 Comparative | Co | 0.6 | 1.3 | 1.9 | 4.9 | 8.0 | Soft, slight tack |
| 1.2 Comparative | Co | 0.06 | 0.8 | 0.9 | 4.9 | 6.1 | Rather soft; slight tack |
| | Ca | 0.25 | | | | | |
| | Pb | 0.5 | | | | | |
| 1.3 Comparative | Co | 0.03 | 0.8 | 2.0 | 2.5 | 4.2 | Hard, tack-free |
| | Al | 1.0 | | | | | |
| 1.4 | Co | 0.03 | 1.1 | 1.9 | 3.5 | 5.0 | Hard, very slight tack |
| | Al | 1.0 | | | | | |
| | DMAE | 1.5 | | | | | |
| | Water | 0.3 | | | | | |
| 1.5 Comparative | Mn | 0.06 | 1.8 | 2.5 | 6.9 | 10.7 | Soft, tacky |
| | Ca | 0.25 | | | | | |
| | Pb | 0.5 | | | | | |
| 1.6 Comparative | Mn | 0.03 | 0.5 | 2.0 | 2.7 | 3.9 | Hard, tack-free |
| | Al | 1.0 | | | | | |
| 1.7 Comparative | Co | 0.03 | 0.7 | 1.0 | 4.8 | 7.0 | Rather soft, slight tack |
| | Ce | 0.15 | | | | | |
| 1.8 | Ce | 0.15 | 0.6 | 2.2 | 3.5 | 4.8 | Hard, very slight tack |
| | Al | 0.5 | | | | | |
| | DMAE | 1.0 | | | | | |
| | Water | 0.2 | | | | | |

WATER IMMERSION OF DRIED FILMS OF EXAMPLES 1.1 TO 1.8 APPLIED TO GLASS

After standing for 7 days the dried films of Examples 1.1 to 1.8 were immersed in water for 42 days and then removed for examination. All were intact and adherent to glass but differed in clarity, as follows:
1.1 White, opaque
1.2 White, but less opaque than 1.1.
1.3 Clear
1.4 Slight opalescence
1.5 White, opaque
1.6 Clear
1.7 Similar to 1.2
1.8 Very slight opalescence

STORAGE STABILITY AFTER 42 DAYS

| Example | 1.1 | 1.2 | 1.3 | 1.4 | 1.5 | 1.6 | 1.7 | 1.8 |
|---|---|---|---|---|---|---|---|---|
| Initial viscosity poises | 4.0 | 4.1 | 4.2 | 3.6 | 3.5 | 3.6 | 4.0 | 3.5 |
| Viscosity after 42 days | 7.9 | 4.8 | 5.2 | 3.7 | 4.2 | 4.7 | 4.6 | 3.7 |

COMMENTS ON EXAMPLES 1.1 TO 1.8

The more rapid drying rate and hardness of Examples 1.4 to 1.8 according to the invention, and of Comparative Examples 1.3 and 1.6 demonstrates the "through drying" efficiency of the aluminium compound compared with the cobalt driers alone in 1.1, to Co/Ca/Pb in 1.2, the Mn/Ca/Pb in 1.5 and the Co/Ce in 1.7. It is notable that the improved drying of Examples 1.3 and 1.6 and of Examples 1.4 and 1.8 was achieved with a lower than normal content of both Co and Mn and with the complete substitution of these driers by cerium in Example 1.8.

The contribution of aluminium driers to reduction in water absorption is confirmed by the comparative clarity of films of the Comparative Examples 1.3 and 1.8 and of Examples 1.4 and 1.8 after 42 days water immersion.

The addition of amine and water in Example 1.4 proved sufficient to stabilise this alkyd medium of known low reactivity with aluminium compounds. The still lower amine and water content used in Example 1.8 proved adequate in its stabilising effect with the lower content of aluminium (0.5% Al) employed.

EXAMPLES 2.1 TO 2.5

These Examples employed a solution of a proprietary oil modified alkyd resin which conformed with the following specification:

| | |
|---|---|
| Maximum acid value | 10 mgms · KOH/gm |
| Solids content when diluted with white spirit to 2 poises | 54% |
| White spirit tolerance | Complete |
| Phthalic anhydride content | 24% |
| Oil content (as fatty acid) | 65% |
| Oil type | Linoleic |
| Esterifying alcohol | Pentaerithrytol |

This resin was considerably more viscous and reactive than the alkyd resin used in Preparation 1. It was diluted with white spirit and with a small addition of methyl ethyl ketoxime as anti-skinning agent to provide the medium (Preparation 2) for Examples 2.1 to 2.5.

PREPARATION 2

| | |
|---|---|
| Alkydresin (as above) | 100 parts by weight |
| White spirit | 82 parts by weight |
| Methyl ethyl ketoxime | 0.25 parts by weight |

This medium was used with the proprietary cobalt drier to provide Comparative Example 2.1; with the proprietary Co/Ca/Pb drier to provide Comparative Example 2.2; with the unstabilised cobalt/aluminium drier (Preparation 3) to provide Comparative Example 2.3; with the stabilised cobalt/aluminium drier (Preparation 4) to provide Example 2.4; and with the stabilised manganese/aluminium drier (Preparation 5) to provide Example 2.5.

The aluminium drier Preparations 3, 4 and 5 had the following compositions:

| | Prep 3 | Prep 4 | Prep 5 |
|---|---|---|---|
| Aluminium tri-isopropoxide | 204 | 204 | 204 |
| Ethyl acetoacetate | 130 | 130 | 130 |
| White spirit | 63 | — | 13 |
| Dimethylaminoethanol | — | 45 | 45 |
| Water | — | 18 | 18 |
| 6% cobalt drier | 27 | 27 | — |
| 6% manganese drier | — | — | 14 |

TABLE 2

| Example | Drier/Preparation | Metal/Stabiliser content % | | Wet film thickness 76μ | | Comments |
|---|---|---|---|---|---|---|
| | | | | Sand dry hours | Hard dry hours | |
| 2.1 | Co drier | Co | 0.06 | 2.1 | 8.5 | Surface tack |
| 2.2 | Co/Ca/Pb drier | Co | 0.06 | 1.5 | 6.6 | Slight surface tack |
| | | Ca | 0.25 | | | |
| | | Pb | 0.5 | | | |
| 2.3 | Prep 3 | Co | 0.06 | 1.2 | 4.7 | Tack-free |
| | | Al | 1.0 | | | |
| 2.4 | Prep 4 | Co | 0.06 | 1.4 | 4.5 | Tack-free |
| | | Al | 1.0 | | | |
| | | DMAE | 1.67 | | | |
| | | Water | 0.67 | | | |
| 2.5 | Prep 5 | Mn | 0.03 | 1.5 | 4.6 | Tack-free |
| | | Al | 1.0 | | | |
| | | DMAE | 1.67 | | | |
| | | Water | 0.67 | | | |

STORAGE STABILITY

| Example | 2.1 | 2.2 | 2.3 | 2.4 | 2.5 |
|---|---|---|---|---|---|
| Initial viscosity poises | 2 | 2 | 2.5 | 2 | 2 |
| Viscosity after 91 days | 3 | 4 | 30 | 2.5 | 2 |

COMMENTS ON EXAMPLES 2.1 TO 2.5

Comparative Example 2.3 exhibits good drying performance but poor storage stability. On the other hand, Preparations 4 and 5, according to the invention, proved stable when used in this medium and contributed drying properties superior to conventional driers, especially in the tack-free quality of the applied film 24 hours after application.

EXAMPLES 3.1 TO 3.4

These Examples also used alkyd medium Preparation 2 but, in this case, the aluminium compound was an oxo compound, of high flash point and the enolate of ethoxyethylacetoacetate was used as substituent. The unstabilised Preparation 6 (Example 3.1) was included for comparative purposes.

|  | Preparation 6 | Preparation 7 | Preparation 8 |
|---|---|---|---|
| Oxo aluminium compound (10% Al) | 80 | 80 | 80 |
| White spirit | 20 | — | 4 |
| Dimethylaminoethanol | — | 16.6 | 16.6 |
| Water | — | 3.4 | 3.4 |
| 6% Cobalt drier | 8 | 8 | — |
| 6% Manganese drier | — | — | 4 |

TABLE 3

| Example | Preparation | Metal/stabiliser | (%) | Wet film thickness 76μ Sand dry hours | Hard dry hours | Comments |
|---|---|---|---|---|---|---|
| 3.1 | Prep 6 | Co | 0.06 | 1.2 | 4.4 | Tack-free |
|  |  | Al | 1.0 |  |  |  |
| 3.2 | Prep 7 | Co | 0.06 | 1.4 | 4.1 | Tack-free |
|  |  | Al | 1.0 |  |  |  |
|  |  | DMAE | 2.08 |  |  |  |
|  |  | Water | 0.42 |  |  |  |
| 3.3 | Prep 7 | Co | 0.03 | 1.7 | 5.3 | Tack-free |
|  |  | Al | 0.5 |  |  |  |
|  |  | DMAE | 1.04 |  |  |  |
|  |  | Water | 0.21 |  |  |  |
| 3.4 | Prep 8 | Mn | 0.03 | 1.3 | 4.5 | Tack-free |
|  |  | Al | 1.0 |  |  |  |
|  |  | DMAE | 2.08 |  |  |  |
|  |  | Water | 0.42 |  |  |  |

STORAGE STABILITY

| Example | 3.1 | 3.2 | 3.3 | 3.4 |
|---|---|---|---|---|
| Initial viscosity poises | 3.5 | 2 | 2 | 2 |
| Viscosity after 12 weeks | 10 | 2.5 | 2+ | 2+ |

COMMENTS ON EXAMPLES 3.1 TO 3.4

The unacceptable thickening arising from the use of Preparation 6 in the Example 3.1 confirms the need for a stabilising amine and water addition which effectively stabilised Examples 3.2, 3.3 and 3.4 according to the invention.

The reduced amount of Preparation 7 used in Example 3.3 suggests that the contribution of aluminium to the drying process, even at this reduced level, is significant and sufficient to compensate for a substantial reduction in the content of the conventional catalytic driers cobalt and manganese. This might provide improvement in durability by reducing oxidative degradation, without, significantly, impairing the drying rate.

EXAMPLE 4

This Example uses the amine stabiliser to solubilise cobalt acetate tetrahydrate and make it compatible with oleo resinous paint media. In the Example, the water content of the salt is "scavenged" by reaction with substituted aluminium alkoxide to further improve solubility and to confer improved stability.

| A | Cobalt acetate tetrahydrate | 25 parts by weight |
|---|---|---|
|  | Dimethylaminoethanol | 35.6 parts by weight |
|  | Methoxyisopropanol | 39.4 parts by weight |
| B | Aluminium tri-isopropoxide | 385 parts by weight |
|  | Ethylacetoacetate | 245 parts by weight |
| C | White spirit | 70 parts by weight |
|  |  | 800 parts by weight |
|  | Co % | 0.74 |
|  | Al % | 6.36 |
|  | DMAE % | 4.45 |
|  | Water % | 0.90 |

The cobalt acetate solution A was prepared by heating to about 60° C. under reflux conditions. The resulting clear solution was added steadily, with stirring, to the pre-formed substituted aluminium alkoxide solution B. Finally, the solution was diluted with the white spirit C.

The product is a clear, blue/red solution of low viscosity which remained clear on prolonged standing under atmospheric conditions and on refrigeration. It is readily compatible with a wide range of oleo-resinous paint media and, at 0.06% Co and 0.5% Al content on medium non-volatiles compares favourably in drying efficiency with conventional combinations of cobalt drier with calcium, lead and zirconium driers.

In comparison with cobalt naphthenate and mixtures of cobalt and lead naphthenate at conventional metal loadings, it has conferred similar, or slightly better drying performance when used in linseed stand oil media. Immersion in water of the dried films has shown that this cobalt acetate/amine/aluminium alkoxide composite confers much improved water resistance and dimensional stability under the conditions of immersion.

PREPARATIONS 9 TO 12

These comprise four proprietary paint driers diluted further with white spirit to provide driers of metal content suitable for the comparative examples in which they are used.

PREPARATION 9—6% COBALT DRIER

| Nuosyn Cobalt 10 | 6 p.b.w. |
|---|---|
| white spirit | 4 p.b.w. |

PREPARATION 10—6% MANGANESE DRIER

| Nuosyn Manganese 10 | 6 p.b.w. |
|---|---|
| White spirit | 4 p.b.w. |

PREPARATION 11—24% LEAD DRIER

| Nuosyn lead 36 | 10 p.b.w. |
|---|---|
| White spirit | 5 p.b.w. |

PREPARATION 12—6% CALCIUM DRIER

| Nuosyn Calcium 10 | 6 p.b.w. |
|---|---|
| White spirit | 4 p.b.w. |

The Nuosyn driers were supplied by Nuodex Limited.

EXAMPLES 5 AND 6

These are solutions of an oxo aluminium compound containing ethyl acetoacetate as substituent and diluted with white spirit to an Al content of 10% and further diluted to 8% Al content by the addition of dimethylaminoethanol and water as follows:

|  | Example 5 | Example 6 |
|---|---|---|
| 10% Al oxo aluminium ethyl acetoacetate | 80 p.b.w. | 80 p.b.w. |
| Dimethylaminoethanol | 20 p.b.w. | 14.2 p.b.w. |
| Water | — p.b.w. | 5.8 p.b.w. |

Example 5 is stabilised sufficiently for use with most alkyd media of greater than 62% oil length. For media of higher reactivity, the use of Example 6 is preferred.

EXAMPLE 7

This is a reaction product of cobalt acetate tetrahydrate with aluminium isopropoxide substituted by the replacement of one isopropoxide by ethyl acetoacetate. By-product isopropanol is removed by distillation up to a temperature of about 120° C. After dilution with xylene and cooling, the stabilising dimethylaminoethanol is added:

| Co acetate 4H$_2$O | 25 p.b.w. |
|---|---|
| Aluminium tri-isopropoxide } ethyl acetoacetate | 620 p.b.w. |
| Distillate (Isopropanol) | −125 p.b.w. |
| Xylene | 40 p.b.w. |
| Dimethylaminoethanol | 40 p.b.w. |
|  | 600 |

The product has a cobalt content of about 1.0% and an aluminium content of about 8.3%.

EXAMPLE 8

This was made by a similar process of condensation and distillation using manganese acetate instead of the the cobalt salt and a lower quantity of the substituted aluminium alkoxide, as follows:

| Mn acetate 4H$_2$O | 25 p.b.w. |
|---|---|
| Aluminium tri-isopropoxide } ethylacetoacetate | 500 p.b.w. |
| Distillate (isopropanol) | −100 p.b.w. |
| Xylene | 35 p.b.w. |
| Dimethylaminoethanol | 40 p.b.w. |
|  | 500 |

The product was a clear brown solution of low viscosity having an Mn content of about 1.1% and an Al content of about 8.1%.

EXAMPLE 9

This example uses the higher methoxypropyl alkoxide of aluminium to dehydrate and solubilise the manganese salt which is subsequently stabilised by the addition of dimethylaminoethanol and increased in its content of aluminium by the addition of the precondensed oxo aluminium acetoacetate:

| Mn acetate 4H$_2$O | 25 p.b.w. |
|---|---|
| Al tri-methoxypropoxide } ethyl acetoacetate | 215 p.b.w. |
| Dimethylaminoethanol | 45 p.b.w. |
| Oxo Al acetoacetate (10% Al) | 365 p.b.w. |
| White spirit | 150 p.b.w. |
|  | 800 p.b.w. |

The product was a clear brown, mobile solution having an Mn content of about 0.75% and an Al content of about 6.25%.

EXAMPLE 10

This example uses manganese metal with acetic acid for the "in situ" preparation of manganese acetate. It also incorporates a higher content of water for greater stability and to expedite the acetic acid/manganese reaction. The process comprises three stages as indicated below. The first stage involves the preparation, under reflux conditions, of a hot solution of manganous acetate in aqueous ethoxyethanol. The second stage involves the addition and dispersion of this solution in aluminium tri-isopropoxide mono-substituted by the addition of ethylacetoacetate followed by condensation and the distillation of by-product isopropanol. The third stage involves dilution, cooling, and the addition of the dimethylaminoethanol stabiliser and dilution with hydrocarbon solvent.

| Stage 1 | Mn metal | 3 p.b.w. |
|---|---|---|
|  | Water | 10 p.b.w. |
|  | Ethoxyethanol | 20 p.b.w. |
|  | Acetic acid | 7 p.b.w. |
|  | Aluminium tri-isopropoxide } ethylacetoacetate | 312.5 p.b.w. 312.5 p.b.w. |
| Stage 2 | Distillate (isopropanol) | −132.5 p.b.w. |
|  | Xylene | 10 p.b.w. |
| Stage 3 | White spirit | 50 p.b.w. |
|  | Dimethylaminoethanol | 20 p.b.w. |
|  |  | 300 p.b.w. |

The product is a clear brown, mobile liquid having an Mn content of about 1.0% and an Al content of about 8.4%. It was readily compatible with drying oil and oleo-resinous media.

PREPARATION 13: PAINT BASE FOR DRIER EVALUATION

The alkyd resin used in this preparation of a white gloss paint base for the evaluation of drier Examples 5 to 10 in comparison with the conventional drier preparations 9 to 12, is the 70% oil length alkyd resin used in Examples 1.1 to 1.8. The paint had the following composition:

| Alkyd resin medium Prep 1 | 161.3 p.b.w. |
|---|---|
| Methylethyl ketoxime | 0.25 p.b.w. |
| Tioxide RCR2 | 80 p.b.w. |
|  | 241.55 p.b.w. |

Tioxide RCR2 is a titanium dioxide pigment supplied by Tioxide International Limited.

Preparation 13, Preparations 9 to 12 and Examples 5 to 10 were used to provide Examples 11.1 to 11.9 which were subjected to a comparative drying rate determination by the Beck Koller method and accelerated weathering by the method of BS 3900 Part F3 (carbon arc lamp). Gloss determinations were carried out by the method of BS 3900 part D5 (Gloss 60°), ISO 2813, 1978, on the unexposed paint film and on the paint film after exposure to 500 hours of accelerated weathering. The determination of colour differences after accelerated weathering was made by the method CIE LAB 1976.

| Example No. | 11.1 | 11.2 | 11.3 | 11.4 | 11.5 | 11.6 | 11.7 | 11.8 | 11.9 |
|---|---|---|---|---|---|---|---|---|---|
| Paint Base Prep 13 | ← | ← | ← | ← | 241.5 | → | → | → | → |
| 6% Co drier Prep 9 | 1 | 1 | 1 | — | — | — | — | — | — |
| 6% Mn drier Prep 10 | — | — | — | 1 | 1 | — | — | — | — |
| 24% Pb drier Prep 11 | — | 2.5 | 2.5 | — | — | — | — | — | — |
| 6% Ca drier Prep 12 | — | — | 4 | — | — | — | — | — | — |
| 8% Al drier Ex. 5 | — | — | — | 6.2 | 12.5 | — | — | — | — |
| Co/Al drier Ex. 7 | — | — | — | — | — | 6 | — | — | — |
| Mn/Al drier Ex. 8 | — | — | — | — | — | — | 5 | — | — |
| Mn/Al drier Ex. 9 | — | — | — | — | — | — | — | 8 | — |
| Mn/Al drier Ex. 10 | — | — | — | — | — | — | — | — | 6 |
| Co/alkyd % | 0.06 | 0.06 | 0.06 | — | — | 0.06 | — | — | — |
| Mn/alkyd % | — | — | — | 0.06 | 0.06 | — | 0.06 | 0.06 | 0.06 |
| Pb/alkyd % | — | 0.6 | 0.6 | — | — | — | — | — | — |
| Ca/alkyd % | — | — | 0.24 | — | — | — | — | — | — |
| Al/alkyd % | — | — | — | 0.5 | 1.0 | 0.5 | 0.4 | 0.5 | 0.5 |
| BK drying time-hours | | | | | | | | | |
| Stage 1 | 4.1 | 2.8 | 1.2 | 0.8 | 0.6 | 1.2 | 0.3 | 0.9 | 0.3 |
| Stage 2 | 4.3 | 3.1 | 1.7 | 4.8 | 3.7 | 3.7 | 3.2 | 3.3 | 3.1 |
| Stage 3 | 7.9 | 6.4 | 6.4 | 6.8 | 4.3 | 5.8 | 4.8 | 4.9 | 4.9 |
| Stage 4 | >11.8 | >11.8 | 11.0 | 9.3 | 7.0 | 7.9 | 7.8 | 8.3 | 7.1 |
| Gloss (Initial) | 86 | 90 | 87 | 88 | 92 | 91 | 90 | 91 | 92 |
| Gloss (500 hours AW) | 30 | 58 | 60 | 77 | 82 | 79 | 80 | 82 | 82 |
| Colour differences (500 hours AW) | 2.95 | 2.53 | 2.89 | 1.44 | 1.01 | 1.39 | 1.96 | 1.56 | 1.63 |

AW = accelerated weathering

EXAMPLE 12

Cerium/Aluminium Drier

| | |
|---|---|
| Cerium tri acetate | 13.6 p.b.w. |
| Water | 10 p.b.w. |
| Methoxypropanol | 16.4 p.b.w. |
| Aluminium tri-isopropoxide/ ethylacetoacetate | 312.5 p.b.w. |
| Distillate (isopropanol) | −132 p.b.w. |
| White spirit | 79.5 p.b.w. |
| Total | 300 p.b.w. |
| Cerium content as Ce % | 2 |
| Aluminium content as Al % | 8.4 |

The mixture of water and methoxypropanol was added slowly to the aluminium tri-isopropoxide previously mono-substituted by reaction with ethylacetoacetate, with stirring and cooling to keep the temperature, preferably, below 35° C. With continued stirring the cerium tri-acetate, in finely divided form was dispersed in the aluminium compound and the temperature slowly raised to reflux (about 82° C.). When all the cerium acetate had dissolved, the by-product isopropanol was removed by distillation and the product cooled and diluted with the requisite white spirit addition. The product, when cool, was a clear, pale yellow liquid of low viscosity.

| Examples | 13.1 | 13.2 | 13.3 | 13.4 |
|---|---|---|---|---|
| Alkyd Medium Prep. 2 | ← | 182.25 | → | → |
| Titanium dioxide | ← | 80 | → | → |
| Dimethylamino ethanol | — | 1.2 | 1.2 | 1.6 |
| Water | — | 0.5 | 0.4 | 0.4 |
| 6% Co Prep 9 | 1 | — | — | — |
| 6% Ca Prep 12 | 4 | — | — | — |
| 24% Pb Prep 11 | 2.5 | — | — | — |
| Co/Al drier Ex 7 | — | 6 | — | — |
| Mn/Al drier Ex 10 | — | — | 6 | — |
| Ce/Al drier Ex 12 | — | — | — | 6 |
| Co content % | 0.06 | 0.06 | 0 | 0 |
| Ca content % | 0.24 | — | — | — |
| Pb content % | 0.6 | — | — | — |
| Mn content % | — | — | 0.06 | — |
| Ce content % | — | — | — | 0.12 |
| Al content % | 0 | 0.5 | 0.5 | 0.5 |
| Total DMAE % | 0 | 1.6 | 1.6 | 1.6 |
| Total water % | 0 | 0.57 | 0.6 | 0.6 |
| BK drying rate | | | | |
| Stage 1 hour | 0.1 | 0.1 | 0.1 | 0.1 |
| 2 hours | 1.7 | 1.8 | 2.0 | 1.8 |
| 3 hours | 3.3 | 3.5 | 4.9 | 3.6 |
| 4 hours | 9.2 | 7.6 | 7.5 | 7.8 |

The dimethylaminoethanol and water additions used in Examples 13.2, 13.3 and 13.4 were added to the alkyd medium Prep 2 before pigmentation.

The three Examples 13.2, 13.3 and 13.4 reached the hard-dry Stage 4 more quickly than the comparative Example 13.1 which retained a pronounced surface "bite" not found on the other three. All proved stable on storage.

I claim:

1. An additive for a surface-coating composition comprising:
   (i) at least one aluminium compound which is an aluminium alkoxide or a compound derived from an aluminum alkoxide by an addition, substitution or condensation reaction;
   (ii) a stabilizer selected from the group comprising ammonium hydroxide, at least one organic base and a mixture of an organic base with ammonia; and
   (iii) a metal-containing organic compound, the metal being selected from Cu, Mn, Fe, Co, Zn and the rare earth metals.

2. An additive according to claim 1, wherein the organic base is an organic amine having a boiling point in the range of from 40° C. to 240° C.

3. An additive according to claim 1, wherein the organic base is selected from
diethylamine, n-butylamine, piperidine;
dimethylaminoethanol, diethylaminoethanol, dimethylamino isopropanol;
morpholine, monoethanolamine;
ethylene diamine, propylene diamine, hexamethylene diamine dipyridyl, phenanthrolines;
amine-terminated polyamide;
tri(dimethylaminoethyl)borate; and
monohydroxyethyl dimethyl ammonium linoleate.

4. An additive according to claim 1, which further comprises 0.5 to 3 mols of water per mole of base.

5. An additive according to claim 1, wherein the metal-containing organic compound is selected from carboxylic acid salts of cobalt, manganese and iron.

6. An additive according to claim 1 wherein the metal-containing organic compound is selected from carboxylic acid salts of cerium or cerium associated with other rare earth metals.

7. An additive according to claim 1, wherein the metal-containing organic compound is cobalt or manganese acetate and the organic base is dimethylamino ethanol.

8. A surface-coating composition comprising:
(i) at least one aluminum compound which is an aluminum alkoxide or a compound derived from an aluminum alkoxide by an addition, substitution or condensation reaction;
(ii) a stabilizer selected from the group comprising ammonium hydroxide, at least one organic base and a mixture of an organic base with ammonia;
(iii) a metal-containing organic compound, the metal being selected from Cu, Mn, Fe, Co, Zn and associated rare earth metals; and
(iv) added water in an amount no greater than one mole of water for each alkoxide group present in the aluminum alkoxide compound or in the aluminum alkoxide from which the aluminum compound is derived, in a polymerised drying or semi-drying oil, an alkyd resin or an oleo-resinous medium.

9. A surface-coating composition comprising:
(i) at least one aluminum compound which is an aluminum alkoxide or a compound derived from an aluminum alkoxide by an addition, substitution or condensation reaction;
(ii) a stabilizer selected from the group comprising ammonium hydroxide, at least one organic base and a mixture of an organic base with ammonia; and
(iii) a metal-containing organic compound, the metal being selected from Cu, Mn, Fe, Co, Zn and associated rare earth metals, in a polymerised drying or semi-drying oil, an alkyd resin or an oleo-resinous medium.

10. A surface coating composition according to claim 9 which comprises the base in an amount sufficient to provide between 0.2% and 10% of the non volatile components of the medium.

11. A process for the preparation of a surface coating composition according to claim 9, which process comprises adding a part or all of the stabilizer to a composite of the aluminum compound and metal-containing organic compound and adding the resulting mixture or complex to the polymerised drying or semi-drying oil, alkyd resin or oleo-resinous medium.

12. A process for the preparation of a surface coating composition according to claim 9, which process comprises adding part or all of the stabilizer to the polymerised drying or semi-drying oil, alkyd resin or oleo-resinous medium and subsequently adding the unstabilized or partially stabilized composite of aluminum compound with the metal-containing organic compound.

13. An additive according to claim 1, further including water in an amount no greater than one mole of water for each alkoxide group present in the aluminum compound.

14. A surface coating composition according to claim 9, further including water in an amount no greater than one mole of water for each alkoxide group present in the aluminum compound.

15. An additive for a surface-coating composition comprising:
(i) at least one aluminum compound which is an aluminum alkoxide or a compound derived from an aluminum alkoxide by an addition, substitution or condensation reaction;
(ii) a stabilizer selected from the group comprising ammonium hydroxide, at least one organic base and a mixture of an organic base with ammonia;
(iii) a metal-containing organic compound, the metal being selected from Cu, Mn, Fe, Co, Zn and the rare earth metals; and
(iv) added water in an amount no greater than one mole of water for each alkoxide group present in the aluminum alkoxide compound or in the aluminum alkoxide from which the aluminum compound is derived.

* * * * *